(12) United States Patent
Katsuma et al.

(10) Patent No.: US 9,511,477 B2
(45) Date of Patent: Dec. 6, 2016

(54) GEAR GRINDING MACHINE

(75) Inventors: Toshifumi Katsuma, Tokyo (JP);
Kunihiro Watanabe, Tokyo (JP);
Toshimasa Kikuchi, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 818 days.

(21) Appl. No.: 13/820,203

(22) PCT Filed: Aug. 25, 2011

(86) PCT No.: PCT/JP2011/069138
§ 371 (c)(1),
(2), (4) Date: Apr. 19, 2013

(87) PCT Pub. No.: WO2012/032941
PCT Pub. Date: Mar. 15, 2012

(65) Prior Publication Data
US 2013/0244549 A1      Sep. 19, 2013

(30) Foreign Application Priority Data

Sep. 7, 2010   (JP) ................... 2010-199455

(51) Int. Cl.
*B24B 53/07*   (2006.01)
*B23F 23/12*   (2006.01)
(Continued)

(52) U.S. Cl.
CPC ............... *B24B 53/075* (2013.01); *B23F 5/04* (2013.01); *B23F 23/1225* (2013.01)

(58) Field of Classification Search
CPC ..... B24B 53/017; B24B 37/005; B24B 53/057
(Continued)

(56) References Cited

U.S. PATENT DOCUMENTS 5,857,894 A     1/1999  Griesbach et al.
6,234,880 B1 *  5/2001  Scacchi ............... B23F 23/1225
                                                           451/443
(Continued)

FOREIGN PATENT DOCUMENTS

JP     10-76424 A      3/1998
JP     2003-39237 A    2/2003
(Continued)

OTHER PUBLICATIONS

International Search Report and Written Opinion of the International Searching Authority with English translation.
(Continued)

*Primary Examiner* — Monica Carter
*Assistant Examiner* — Lauren Beronja
(74) *Attorney, Agent, or Firm* — Birch, Stewart, Kolasch & Birch, LLP

(57) ABSTRACT

Provided is a gear grinding machine which can dress a grinding stone while a gear is held attached to the machine regardless of the size of the gear. To this end, the gear grinding machine (1) engages and mutually rotates a work (W) and the grinding stone (17) to thereby grind the work (W), wherein the gear grinding machine is equipped with a turning table (22) which holds the work (W) and rotates around a work rotating shaft (C), and a pivot table (31) which is pivotably supported around the work rotating shaft (C); and a dresser (40) which is capable of dressing the grinding stone (17) is provided on the pivot table (31), the pivot table (31) being pivoted to move the dresser (40) between a dressing position (D1) and a retreat position (D2).

3 Claims, 6 Drawing Sheets

(51) Int. Cl.
*B23F 5/04* (2006.01)
*B24B 53/075* (2006.01)

(58) Field of Classification Search
USPC .............. 451/72, 21, 5, 8–10, 56, 47, 253; 125/11.01, 11.03
See application file for complete search history.

(56) References Cited

U.S. PATENT DOCUMENTS

| | | | |
|---|---|---|---|
| 6,379,229 B1* | 4/2002 | Wakabayashi | B24B 53/017 451/443 |
| 7,927,048 B2* | 4/2011 | Gumpl | B23F 5/20 409/2 |
| 2003/0027507 A1 | 2/2003 | Stollberg | |
| 2007/0202774 A1* | 8/2007 | Yanase | B23F 23/1225 451/5 |
| 2009/0227182 A1 | 9/2009 | Breith et al. | |
| 2011/0275290 A1 | 11/2011 | Ochi et al. | |

FOREIGN PATENT DOCUMENTS

| | | |
|---|---|---|
| JP | 2005-111600 A | 4/2005 |
| JP | 2009-214291 A | 9/2009 |
| JP | 2010-29950 A | 2/2010 |
| JP | 4467870 B2 | 3/2010 |
| TW | 201029804 A | 8/2010 |

OTHER PUBLICATIONS

Taiwanese Office Action, dated Oct. 17, 2013, issued in Taiwanese Patent Application No. 100129810.

* cited by examiner

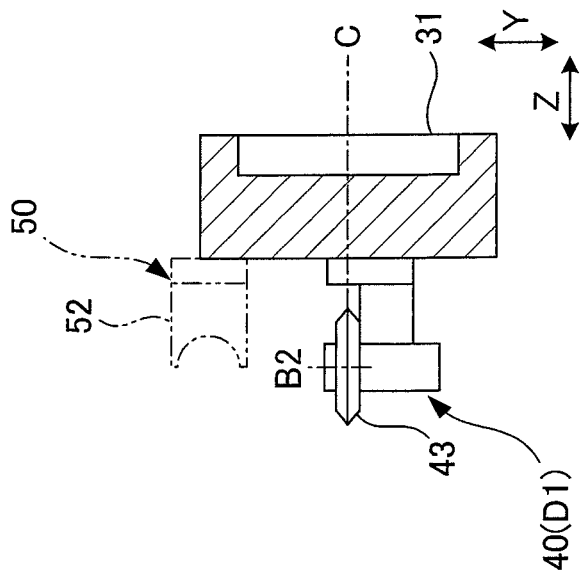
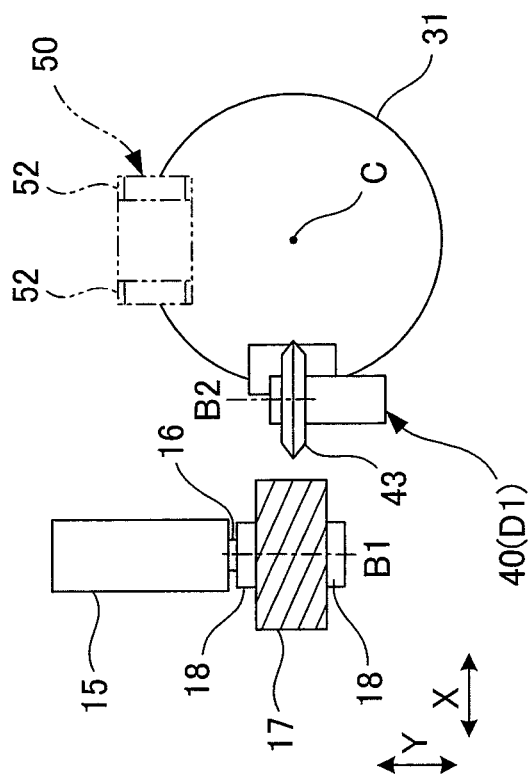

GEAR GRINDING MACHINE

TECHNICAL FIELD

The present invention relates to a gear grinding machine for grinding a gear to be machined by using a grinding wheel and relates particularly to a gear grinding machine having a dressing function of dressing the grinding wheel.

BACKGROUND ART

Gear grinding machines have been conventionally provided to grind a gear with a grinding wheel after heat treatment of the gear and thereby efficiently finish a tooth surface of the gear. In such gear grinding machines, repeated grinding wears out the grinding wheel, deteriorating the sharpness thereof. Accordingly, after a predetermined number of gears are ground, dressing needs to be performed on the worn grinding wheel to restore edges thereof to sharp edges.

Therefore, the conventional gear grinding machines are provided with a dressing device which dresses the worn grinding wheel with a dresser. Such a gear grinding machine provided with the dressing device is disclosed, for example, in Patent Document 1.

PRIOR ART DOCUMENT

Patent Document

Patent Document 1: Japanese Patent Application Publication No. 2005-111600

SUMMARY OF THE INVENTION

Problems to be Solved by the Invention

In the conventional gear grinding machine described above, a counter column is provided to a rotary table holding a gear, at a position opposite a column supporting a grinding wheel. Further, a turn ring is turnably supported on an outer periphery of the counter column. Moreover, this turn ring is provided with grippers capable of gripping the gear and a dressing device capable of dressing the grinding wheel. Hence, loading and unloading of the gear is made possible by turning the gripper relative to the rotary table, while dressing of the grinding wheel is made possible by turning the dressing device relative to the grinding wheel supported on the column.

However, such a conventional gear grinding machine has the following risk. The rotary table for attaching the gear is provided between the column and the counter column. Accordingly, when the grinding wheel is to be dressed by the dressing device with a relatively-large gear attached to the rotary table, the grinding wheel or the dressing device may come into contact with the large gear during the dressing operation.

Further, removing the gear from the rotary table before dressing the grinding wheel is conceivable to solve such a problem. However, this gear removing and attaching work is very extensive when the gear is large.

The present invention has been made to solve the problems described above, and an object thereof is to provide a gear grinding machine capable of dressing a grinding wheel with a gear attached, regardless of the size of the gear.

Means for Solving the Problems

A gear grinding machine according to a first aspect of the present invention solving the above problems is a gear grinding machine for performing grinding on a gear to be machined by rotating the gear to be machined and a grinding wheel in mesh with each other, characterized in that the gear grinding machine comprises: a rotary table configured to hold the gear to be machined and to rotate about a workpiece rotation axis; grinding wheel moving means for rotatably supporting the grinding wheel and moving the grinding wheel relative to the workpiece rotation axis; a ring-shaped turn table disposed coaxially with the rotary table at a position radially outside the rotary table, and supported turnably about the workpiece rotation axis; dressing means provided on the turn table and having a dresser capable of dressing the grinding wheel; and table turning means for turning the turn table about the workpiece rotation axis in such a way that the dressing means moves between a dressing position where the dressing means is capable of dressing the grinding wheel supported by the grinding wheel moving means and a retreat position where the dressing means is retreated from the dressing position during the grinding.

A gear grinding machine according to a second aspect of the present invention solving the above problems is characterized in that the table turning means turns the turn table about the workpiece rotation axis in such a way that the dressing means moves to a dresser replacement position where replacement of the dresser is possible.

A gear grinding machine according to a third aspect of the present invention solving the above problems is characterized in that the gear grinding machine further comprises: a stationary table provided radially outside the rotary table and configured to support the rotary table with the rotary table being rotatable about the workpiece axis; and an annular groove provided in an radially-outer portion of the stationary table and configured to house the turn table with the turn table being turnable.

A gear grinding machine according to a fourth aspect of the present invention solving the above problems is characterized in that the gear grinding machine further comprises a grinding wheel receiving stage provided on the turn table and configured in such a way that the grinding wheel is mounted on the gear grinding wheel receiving stage, and the table turning means turns the turn table about the workpiece rotation axis in such a way that the grinding wheel receiving stage moves between a grinding wheel replacement position where replacement of the grinding wheel in the grinding wheel moving means is possible and a grinding wheel loading/unloading position where loading and unloading of the grinding wheel to and from the grinding wheel receiving stage is possible.

Effect of the Invention

In the gear grinding machine of the present invention, the turn table is turned about the workpiece rotation axis at a position radially outside the rotary table which holds the gear to be processed and which is rotated about the workpiece rotation axis, and the dressing means is thereby moved between the dressing position and the retreat position. This allows the grinding wheel to be dressed with the gear to be machined attached to the rotary table, regardless of the size of the gear to be machined.

BRIEF DESCRIPTION OF THE DRAWINGS

FIG. 4 includes views showing a state where a dressing device is set at a dressing position. Specifically, Part (a) is a plan view of such state, and Part (b) is a side view of such state.

MODE FOR CARRYING OUT THE INVENTION

A gear grinding machine of the present invention is described below in detail by using the drawings.

Embodiment

Figure 1:
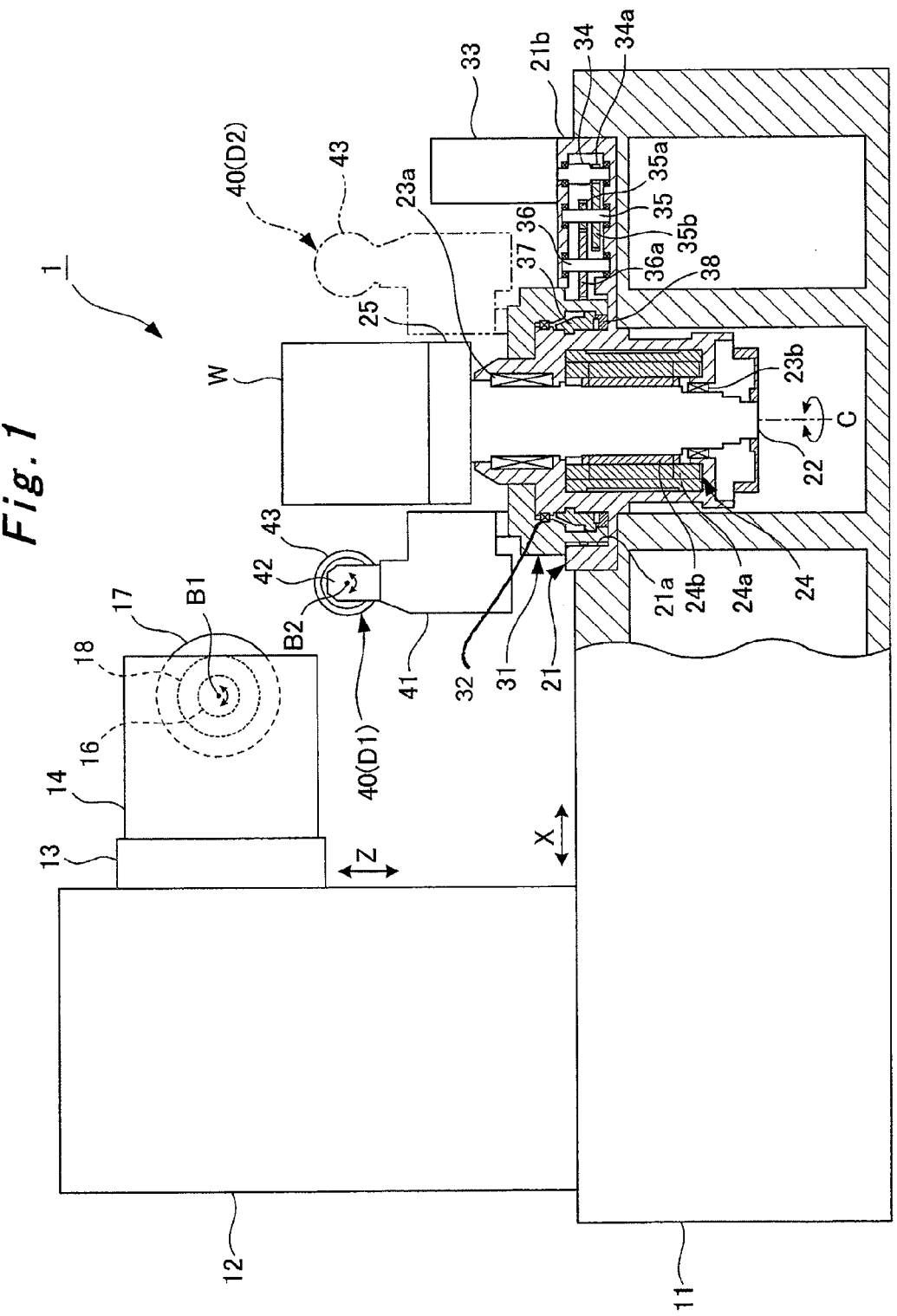
FIG. 1 is a side view of a gear grinding machine according to an embodiment of the present invention.
Figure 2:
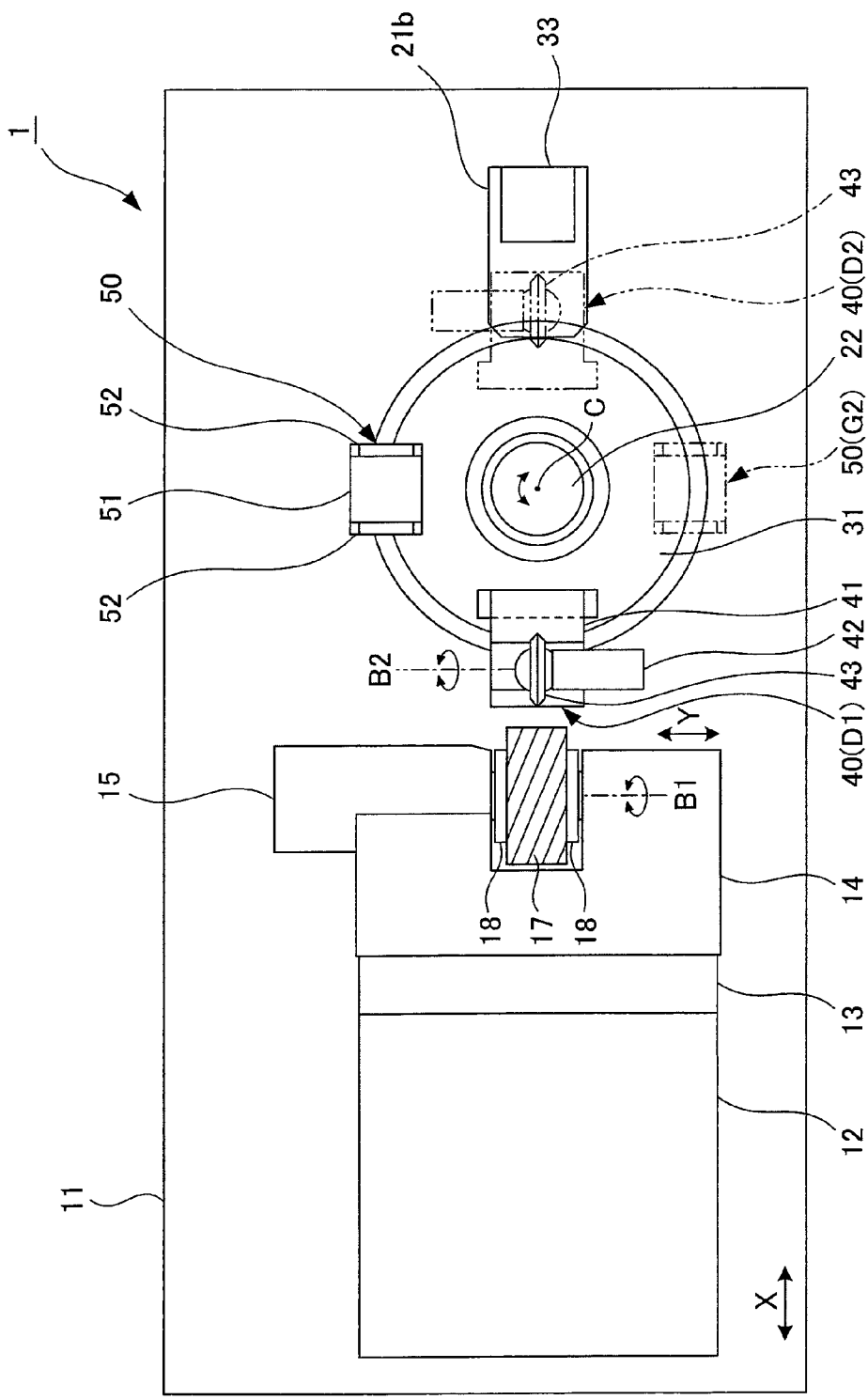
FIG. 2 is a plan view of the gear grinding machine according to the embodiment of the present invention.

As shown in FIGS. 1 and 2, a gear grinding machine 1 is provided with a bed 11. A column 12 is supported on this bed 11 to be movable in a horizontal X-axis direction. Moreover, a saddle 13 is supported on the column 12 to be movable up and down in a vertical Z-axis direction. A grinding wheel head 14 is supported on this saddle 13 to be movable in an axial direction of a grinding wheel rotation axis B1 (horizontal Y-axis direction).

In addition, a grinding wheel rotating motor 15 is provided in the grinding wheel head 14. A grinding wheel shaft 16 is supported by the grinding wheel rotating motor 15 to be rotatable about the grinding wheel rotation axis B1. Further, a threaded grinding wheel 17 having a helical thread formed in an outer peripheral surface thereof is detachably attached to the grinding wheel shaft 16.

Note that a grinding wheel attachment structure for attaching the grinding wheel 17 to the grinding wheel shaft 16 is as follows. First, flange members are fitted into a through hole of the cylindrical grinding wheel 17 from both sides of the through hole, respectively. Then, with the grinding wheel 17 held between flange portions 18 of the flange members, the grinding wheel 17 is fixedly attached to the grinding wheel shaft 16.

Accordingly, the grinding wheel 17 can be moved in the X-axis direction, the Y-axis direction, the Z-axis direction, and the axial direction of the grinding wheel rotation axis B1 by driving the column 12, the saddle 13, and the grinding wheel head 14. Moreover, the grinding wheel 17 can be rotated about the grinding wheel rotation axis B1 via the grinding wheel shaft 16 by driving the grinding wheel rotating motor 15. Note that the column 12, the saddle 13, and the grinding wheel head 14 form grinding wheel moving means for moving the grinding wheel 17.

Moreover, a cylindrical stationary table 21 is provided in an upper portion of the bed 11. A shaft-shaped rotary table 22 is supported at a position radially inside the stationary table 21 via bearings 23a and 23b to be rotatable about a vertical workpiece rotation axis C.

A table rotating motor 24 is provided between the stationary table 21 and the rotary table 22. The table rotating motor 24 is formed of a stator 24a fixed on an inner peripheral surface of the stationary table 21 and a rotor 24b fixed on an outer peripheral surface of the rotary table 22. Further, a workpiece (gear to be machined) W is attached on a top surface of the rotary table 22 via an attachment jig 25. Accordingly, the workpiece W can be thus rotated together with the rotary table 22 about the workpiece rotation axis C by driving the table rotating motor 24.

Meanwhile, an annular groove 21a which is open at an upper portion thereof is formed in a radially-outer portion of the stationary table 21 to extend in a circumferential direction of the stationary table 21. A ring-shaped turn table 31 is housed in the annular groove 21a with a bearing 32 in between to be turnable about the workpiece rotation axis C. Specifically, the turn table 31 is disposed coaxially with the stationary table 21 and the rotary table 31.

Figure 3:
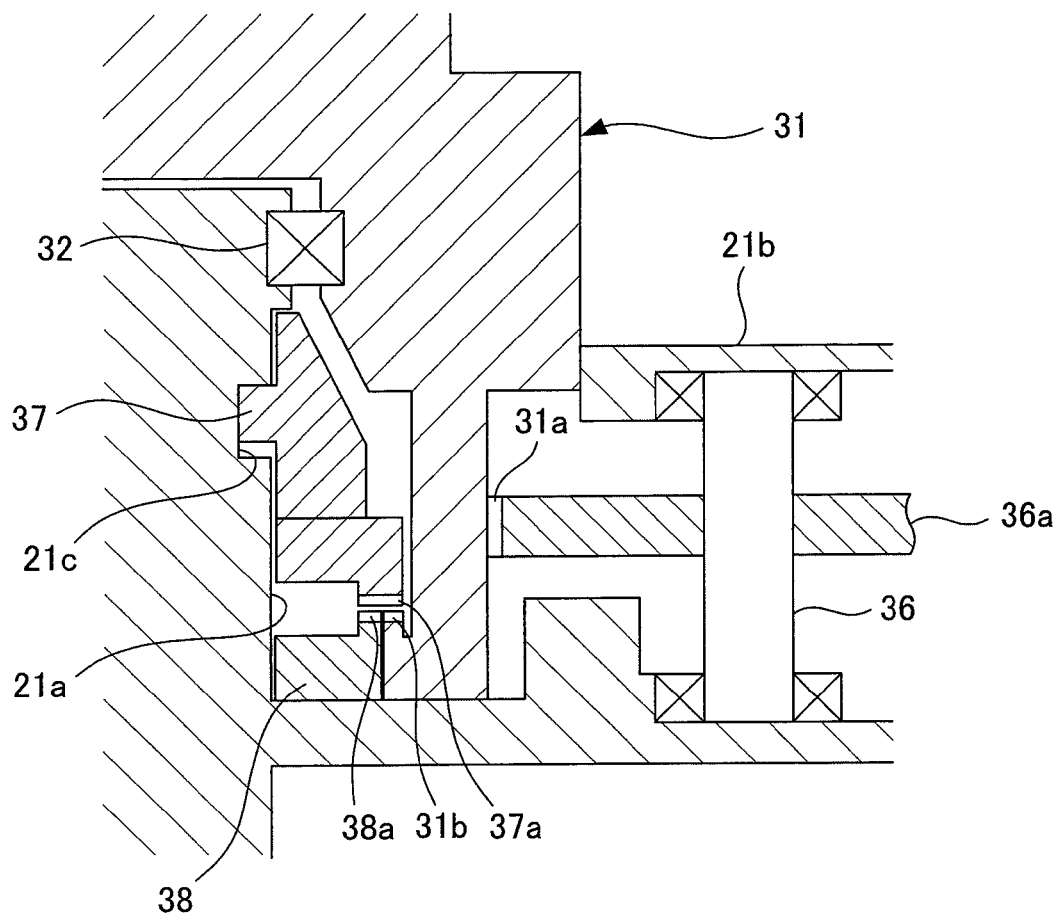
FIG. 3 is an enlarged view of a main portion of FIG. 1.

Moreover, as shown in FIG. 3, a turning gear 31a is formed in an outer peripheral surface of the turn table 31 to extend in a circumferential direction thereof. Furthermore, a positioning gear 31b is formed in a lower portion of an inner peripheral surface of the turn table 31 to extend in a circumferential direction thereof.

A hollow gear box portion 21b is formed integrally with the annular groove 21a. The gear box portion 21b extends radially (X-axis direction) outward from the center (workpiece rotation axis C) of the rotary table 21 to the opposite side from the column 12. A table turning motor (table turning means) 33 is provided on an upper portion of the gear box portion 21b at an outer end thereof. A driving shaft 34 of the table turning motor 33 is disposed in the gear box portion 21b. A driving gear 34a is formed in an outer peripheral surface of the driving shaft 34 to extend in a circumferential direction thereof.

An intermediate shaft 35 and a driven shaft 36 are rotatably supported in the gear box portion 21b. The intermediate shaft 35 is provided with an upper intermediate gear 35a and a lower intermediate gear 35b, while the driven shaft 36 is provided with a driven gear 36a. Further, the driving gear 34a and the lower intermediate gear 35b mesh with each other, the upper intermediate gear 35a and the driven gear 36a mesh with each other, and the driven gear 36a and the turning gear 31a mesh with each other.

In addition, as shown in FIGS. 1 and 3, a ring-shaped sliding member 37 and a ring-shaped fixed member 38 are provided between an inner wall surface of the annular groove 21a (i.e., an outer peripheral surface of the stationary table 21) and an inner peripheral surface of the turn table 31, the sliding member 37 being arranged above the fixed member 38.

A recessed cylinder portion 21c is formed in the inner wall surface of the annular groove 21a. The sliding member 37 is supported by the cylinder portion 21c to be slidable in the vertical direction. Moreover, hydraulic pressure can be supplied to and released from an upper portion and a lower portion of the cylinder portion 21c. The sliding member 37 moves downward when the hydraulic pressure is supplied to the upper portion of the cylinder portion 21c and moves upward when the hydraulic pressure is supplied to the lower portion of the cylinder portion 21c. Moreover, a positioning gear 37a is formed in a bottom surface of the sliding member 37. Meanwhile, the fixed member 38 is fixed in the annular groove 21a, and a positioning gear 38a is formed in a top surface thereof.

The positioning gear 37a of the sliding member 37 can mesh with the positioning gear 31b of the turn table 31 and the positioning gear 38a of the fixed member 38 in the vertical direction. In other words, the positioning gears 31b, 37a, 38a form a gear coupling, and positioning of the turn table 31 in a turning direction thereof is performed by the meshing of these gears.

Hence, the turn table 31 can be rotated about the workpiece rotation axis C via the gears 34a, 35a, 35b, 36a, and 31a by driving the table turning motor 33. In a state where the sliding member 37 has slid to the uppermost position, the positioning gear 37a does not mesh with the positioning gears 31b and 38a, allowing the turn table 31 to turn. Meanwhile, in a state where the sliding member 37 has slid to the lowermost position, the positioning gear 37a meshes with the positioning gears 31b and 38a, allowing positioning of the turn table 31 in the turning direction to be performed.

A dressing device (dressing means) 40 and a grinding wheel receiving stage 50 are provided on a top surface of the turn table 31. Note that the dressing device 40 and the grinding wheel receiving stage 50 are disposed respectively at positions shifted from each other by 90° in phase in the circumferential direction of the turn table 31.

The dressing device 40 is a device for dressing the grinding wheel 17 and is formed of a device main body 41 fixed on the top surface of the turn table 31, a dresser rotating motor 42 provided on this device main body 41, and a disc-shaped dresser 43 detachably attached to the dresser rotating motor 42. Hence, the dresser 43 can be rotated about a horizontal dresser rotation axis B2 by driving the dresser rotating motor 42.

Meanwhile, the grinding wheel receiving stage 50 is a stage for mounting the grinding wheel 17 and is formed of a receiving stage main body 51 detachably attached on the top surface of the turn table 31 and a pair of left and right receiving members 52 provided respectively on both widthwise sides of the receiving stage main body 51. Note that the distance between the pair of the left and right receiving members 52 are set to be the same as the distance between the flange portions 18 provided in both end portions of the grinding wheel 17, and top surfaces of these receiving members 52 are formed in an arc shape to allow the flange portions 18 to be fitted thereto.

As shown in FIGS. 1, 2, 4, and 6, positioning the turn table 31 by causing the turn table 31 to turn at a predetermined turning angle allows the dressing device 40 to be set at any of a dressing position D1, a retreat position D2, and a dresser replacement position D3 and also allows the grinding wheel receiving stage 50 to be set at a grinding wheel replacement position G1 or a grinding wheel loading/unloading position G2.

Here, the dressing position D1 (a state where the turning angle of the turntable 31 is 0°) is a position where the dressing device 40 faces the grinding wheel 17 attached to the grinding wheel shaft 16. Setting the dressing device 40 at the dressing position D1 allows the grinding wheel 17 to be dressed by the dresser 43.

Moreover, the retreat position D2 (a state where the turning angle of the turn table 31 is 180°) is a position where the dressing device 40 is farthest away from the dressing position D1, i.e. a position on a side opposite to the column 12 with a rotary table 21 in between. Setting the dressing device 40 at the retreat position D2 allows the workpiece W to be ground by the grinding wheel 17.

Furthermore, the dresser replacement position D3 (a state where the turning angle of the turn table 31 is 90°) is an intermediate position between the dressing position D1 and the retreat position D2 and is a position facing a worker. Setting the dressing device 40 at the dresser replacement position D3 allows the worker to replace the dresser 43.

Meanwhile, the grinding wheel replacement position G1 (the state where the turning angle of the turn table 31 is 90°) is a position where the grinding wheel receiving stage 50 faces the grinding wheel 17 attached to the grinding wheel shaft 16. Setting the grinding wheel receiving stage 50 at the grinding wheel replacement position G1 allows replacement of the grinding wheel 17 in the grinding wheel head 14.

Moreover, the grinding wheel loading/unloading position G2 (the state where the turning angle of the turn table 31 is) 180° is a position facing the worker. Setting the grinding wheel receiving stage 50 at the grinding wheel loading/unloading position G2 allows the worker to load and unload (replace) the grinding wheel 17 onto and from the grinding wheel receiving stage 50.

Figure 5A:
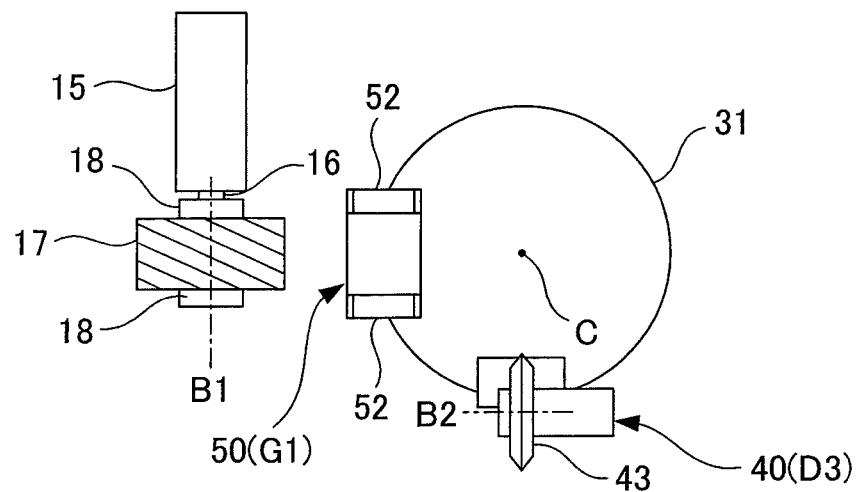
FIG. 5 includes views showing a state where the dressing device is set at a dresser replacement position and a grinding wheel receiving stage is set at a grinding wheel replacement position. Specifically, Part (a) is a plan view of such state, and Part (b) is a side view of such state.
Figure 5B:
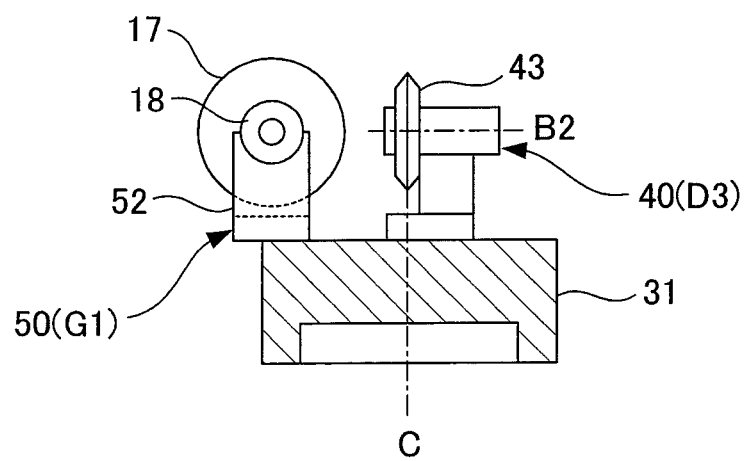
Figure 6:
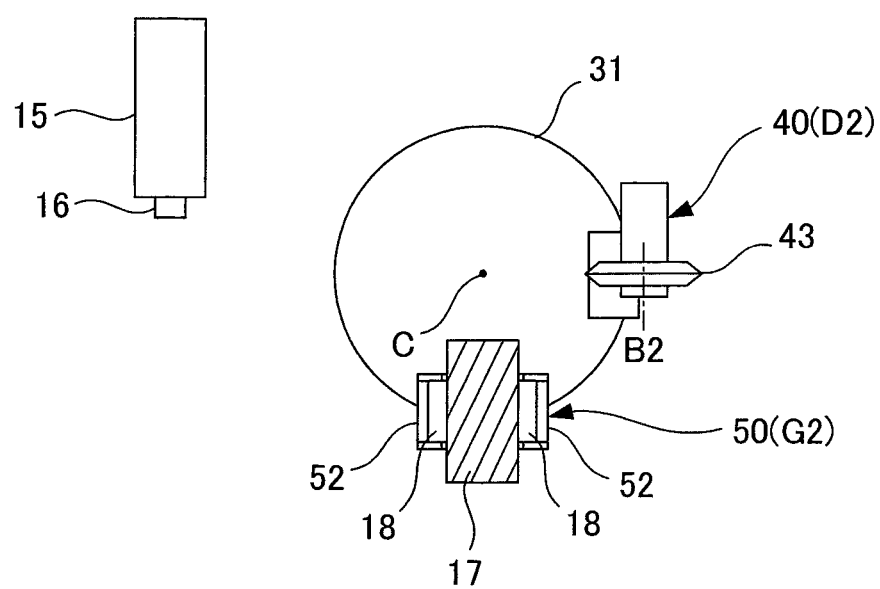
FIG. 6 is a view showing a state where the dressing device is set at a retreat position and the grinding wheel receiving stage is set at a grinding wheel loading/unloading position.

Next, operations of the gear grinding machine 1 are described by using FIGS. 4 to 6.

When the workpiece W is to be ground by the grinding wheel 17, the grinding wheel 17 is first moved in the X-axis direction, the Y-axis direction, the Z-axis direction, and the axial direction of the grinding wheel rotation axis B1 to stand by at a position above or below the workpiece W attached to the attachment jig 25.

Then, the grinding wheel 17 is rotated about the grinding wheel rotation axis B1, and the workpiece W is rotated about the workpiece rotation axis C. Thereafter, the grinding wheel 17 is moved in the Z-axis direction and is made to mesh with the workpiece W. Tooth surfaces of the workpiece W are thus ground by edge surfaces of the grinding wheel 17.

Note that, in the grinding described above, as shown in FIG. 6, the turn table 31 is turned to set the dressing device 40 at the retreat position D2 in advance. Meanwhile, as illustrated by two-dot chain lines of Parts (a) and (b) of FIG. 4, the grinding wheel receiving stage 50 is removed from the turn table 31 in advance.

When a certain number of workpieces W are ground by using the grinding wheel 17, the edge surfaces thereof wears and the sharpness thereof deteriorates. Hence, the grinding wheel 17 needs to be regularly dressed by the dresser 43.

When the grinding wheel 17 is to be dressed by the dresser 43, as shown in Parts (a) and 4 (b) of FIG. 4, the turn table 31 is turned with the workpiece W attached to the attachment jig 25, and the dressing device 40 is thereby moved from the retreat position D2 to the dressing position D1.

Next, the dresser 43 is rotated about the dresser rotation axis B2. Thereafter, the grinding wheel 17 is moved in the X-axis direction, the Y-axis direction, the Z-axis direction, and the axial direction of the grinding wheel rotation axis B1 and is made to mesh with the dresser 43 set at the dressing position D1.

Then, from this meshing state, the grinding wheel 17 is rotated about the grinding wheel rotation axis B1 and is moved in the Y-axis direction and the axial direction of the grinding wheel rotation axis B1. The edge surfaces of the grinding wheel 17 are thus dressed by edge surfaces of the dresser 43.

Moreover, when the dresser 43 wears and is to be replaced with the new dresser 43 or when the dresser 43 is to be replaced with the dresser 43 of a different type depending on an edge shape of the grinding wheel 17, as shown in Parts (a) and (b) of FIG. 5, the turn table 31 is turned with the workpiece W attached to the attachment jig 25 to move the dressing device 40 from the dressing position D1 or the retreat position D2 to the dresser replacement position D3.

Then, the worker performs a replacement work of the dresser 43 for the dressing device 40 set at the dresser replacement position D3.

Then, as shown in Parts (a) and (b) of FIG. 4, the turn table 31 is turned so that the dressing device 40 for which the dresser replacement work has been completed is moved from the dresser replacement position D3 to the dressing position D1. Thereafter, the grinding wheel 17 is subsequently dressed by the replaced dresser 43.

Instead, as shown in FIG. 6, the turn table 31 is turned so that the dressing device 40 for which the dresser replacement work has been completed is moved from the dresser replacement position D3 to the retreat position D2. Thereafter, the replaced dresser 43 is made to standby for the next dressing.

Furthermore, when the grinding wheel 17 wears and is to be replaced with the new grinding wheel 17 or when the grinding wheel 17 is to be replaced with the grinding wheel 17 of a different type depending on a tooth profile of the workpiece W, the turn table 31 is first turned with the workpiece W attached to the attachment jig 25, and the worker attaches the empty grinding wheel receiving stage 50 to a predetermined position of the turn table 31 at the grinding wheel loading/unloading position G2.

Then, as shown in Part (a) of FIG. 5, the turn table 31 is turned so that the empty grinding wheel receiving stage 50 is moved from the grinding wheel loading/unloading position G2 to the grinding wheel replacement position G1.

Next, the grinding wheel 17 is moved in the X-axis direction, the Y-axis direction, the Z-axis direction and the axial direction of the grinding wheel rotation axis B1 to be mounted on the empty grinding wheel receiving stage 50 set at the grinding wheel replacement position G1. At this time, the flange portions 18 of the grinding wheel 17 are fitted to the receiving members 52 of the grinding wheel receiving stage 50.

Subsequently, as shown in Part (b) of FIG. 5, the grinding wheel head 14 is moved in the X-axis direction, the Y-axis direction, the Z-axis direction, and the axial direction of the grinding wheel rotation axis B1 with the grinding wheel 17 mounted on the grinding wheel receiving stage 50 to pull the grinding wheel shaft 16 out from the grinding wheel 17. Hence, the grinding wheel 17 is separated from the grinding wheel head 14.

Then, as shown in FIG. 6, the turn table 31 is turned to move the grinding wheel receiving stage 50 having the grinding wheel 17 mounted thereon from the grinding wheel replacement position G1 to the grinding wheel loading/unloading position G2.

Next, the worker performs the loading/unloading (replacement) work of the grinding wheel 17 to and from the grinding wheel receiving stage 50 set at the grinding wheel loading/unloading position G2. Specifically, the mounted grinding wheel 17 is unloaded from the grinding wheel receiving stage 50 and the new grinding wheel 17 is loaded onto the empty grinding wheel receiving stage 50.

Then, as shown in Part (b) of FIG. 5, the turn table 31 is turned to move the grinding wheel receiving stage 50 having the new grinding wheel 17 mounted thereon from the grinding wheel loading/unloading position G2 to the grinding wheel replacement position G1.

Subsequently, as shown in Part (a) of FIG. 5, the grinding wheel head 14 is moved in the X-axis direction, the Y-axis direction, the Z-axis direction, and the axial direction of the grinding wheel rotation axis B1 with the grinding wheel 17 mounted on the grinding wheel receiving stage 50 to fit the grinding wheel shaft 16 into the grinding wheel 17. The new grinding wheel 17 is thus attached to the grinding wheel shaft 16, and the replacement of the grinding wheel 17 is completed.

Then, as shown in FIG. 6, the turn table 31 is turned to move the empty grinding wheel receiving stage 50 from the grinding wheel replacement position G1 to the grinding wheel loading/unloading position G2. Thereafter, the grinding wheel receiving stage 50 is detached by the worker.

In the embodiment described above, the gear grinding machine of the present invention is applied to the gear grinding machine 1 employing a generating grinding method using the threaded grinding wheel 17. However, the gear grinding machine of the present invention may be applied to a gear grinding machine employing a profile grinding method using a disc-shaped grinding wheel.

In the gear grinding machine of the present invention, the turn table 31 is turned about the workpiece rotation axis C at a position radially outside the rotary table 22 which holds the workpiece W and which is rotated about the workpiece rotation axis C, and the dressing device 40 is thereby moved between the dressing position D1 and the retreat position D2. Accordingly, a contact between the dressing device 40 and the workpiece W can be prevented. This allows the grinding wheel 17 to be dressed by the dresser 43 with the workpiece W attached to the rotary table 22, regardless of the size of the workpiece W.

Moreover, turning the turn table 31 to move the dressing device 40 to the dresser replacement position D3 allows the dresser 43 to be easily replaced with the workpiece W attached to the rotary table 22.

In addition, the annular groove 21a is provided in the radially-outer portion of the stationary table 21 which rotatably supports the rotary table 22, and the turn table 31 is turnably housed in the annular groove 21a. This allows the turn table 31 to be stably turned.

Furthermore, the turn table 31 is turned about the workpiece rotation axis C to move the grinding wheel receiving stage 50 between the grinding wheel replacement position G1 and the grinding wheel loading/unloading position G2. Accordingly, a contact of the workpiece W with the grinding wheel receiving stage 50 and the grinding wheel 17 mounted thereon is prevented. This allows the grinding wheel 17 to be easily replaced with the workpiece W attached to the rotary table 22, regardless of the size of the workpiece W.

INDUSTRIAL APPLICABILITY

The present invention can be applied to a gear grinding machine designed to save space.

The invention claimed is:

1. A gear grinding machine for performing grinding on a gear to be machined by rotating the gear to be machined and a grinding wheel in mesh with each other, the gear grinding machine comprising:
   a rotary table configured to hold the gear to be machined and to rotate about a workpiece rotation axis;
   grinding wheel moving means for rotatably supporting the grinding wheel and moving the grinding wheel relative to the workpiece rotation axis;
   a ring-shaped turn table disposed coaxially with the rotary table at a position radially outside the rotary table, and supported turnably about the workpiece rotation axis;
   dressing means provided on the turn table and having a dresser capable of dressing the grinding wheel;
   table turning means for turning the turn table about the workpiece rotation axis in such a way that the dressing means moves between a dressing position where the dressing means is capable of dressing the grinding wheel supported by the grinding wheel moving means and a retreat position where the dressing means is retreated from the dressing position during the grinding;

a stationary table provided radially outside the rotary table and configured to support the rotary table with the rotary table being rotatable about the workpiece axis; and an annular groove provided in a radially-outer portion of the stationary table and configured to house the turn table with the turn table being turnable.

2. The gear grinding machine according to claim 1, wherein the table turning means turns the turn table about the workpiece rotation axis in such a way that the dressing means moves to a dresser replacement position where replacement of the dresser is possible.

3. The gear grinding machine according to claim 1, wherein the gear grinding machine further comprises a grinding wheel receiving stage provided on the turn table and configured in such a way that the grinding wheel is mounted on the gear grinding wheel receiving stage, and the table turning means turns the turn table about the workpiece rotation axis in such a way that the grinding wheel receiving stage moves between a grinding wheel replacement position where replacement of the grinding wheel in the grinding wheel moving means is possible and a grinding wheel loading/unloading position where loading and unloading of the grinding wheel to and from the grinding wheel receiving stage is possible.

\* \* \* \* \*